United States Patent [19]
Gomez

[11] Patent Number: 5,882,502
[45] Date of Patent: Mar. 16, 1999

[54] ELECTROCHEMICAL SYSTEM AND METHOD

[75] Inventor: Rodolfo Gomez, Urrbrae, Australia

[73] Assignee: RMG Services Pty Ltd., Adelaide, Australia

[21] Appl. No.: 710,983

[22] Filed: Sep. 25, 1996

Related U.S. Application Data

[63] Continuation-in-part of Ser. No. 318,782, Oct. 3, 1994, Pat. No. 5,569,370.

[30] Foreign Application Priority Data

| Sep. 25, 1995 | [AU] | Australia | PN5584 |
| Sep. 27, 1995 | [AU] | Australia | PN5645 |
| Oct. 6, 1995 | [AU] | Australia | PN5829 |
| Oct. 9, 1995 | [AU] | Australia | PN5846 |
| Nov. 16, 1995 | [AU] | Australia | PN6603 |
| Nov. 27, 1995 | [AU] | Australia | PN6830 |
| Dec. 4, 1995 | [AU] | Australia | PN6921 |
| Apr. 15, 1996 | [AU] | Australia | PN9234 |
| Apr. 26, 1996 | [AU] | Australia | PN9484 |
| Jul. 17, 1996 | [AU] | Australia | PO1055 |

[51] Int. Cl.$^6$ ............... C25C 1/20; C25C 7/00; C25C 7/04; C25C 7/06
[52] U.S. Cl. .......... 205/568; 205/571; 204/222; 204/232; 204/237; 204/260; 204/272; 204/273; 204/274; 204/277; 204/263; 204/268; 204/269; 204/284; 204/294; 75/741
[58] Field of Search .................. 204/269, 263, 204/257, 273, 222, 265, 270, 268; 205/568, 571, 508, 586, 589, 596

[56] References Cited

U.S. PATENT DOCUMENTS

| 1,001,449 | 8/1911 | Robertson . | |
| 3,737,381 | 6/1973 | White et al. | 204/257 X |
| 3,788,965 | 1/1974 | Holsinger | 204/234 |
| 3,926,752 | 12/1975 | Loretto et al. | 205/582 |
| 4,061,552 | 12/1977 | Everett | 205/543 |
| 4,159,232 | 6/1979 | Bacon et al. | 205/347 |
| 4,181,588 | 1/1980 | Wong et al. | 205/600 |
| 4,214,964 | 7/1980 | Cannell | 205/594 |
| 4,282,082 | 8/1981 | Cook et al. | 204/269 X |
| 4,594,132 | 6/1986 | Satchell, Jr. et al. | 205/581 |
| 4,935,109 | 6/1990 | Dugan | 204/269 X |
| 5,183,544 | 2/1993 | Weber et al. | 204/252 |
| 5,281,494 | 1/1994 | Ettel et al. | 429/223 |
| 5,372,683 | 12/1994 | von Burgsdorff | 204/269 X |
| 5,529,672 | 6/1996 | Barr et al. | 204/272 |
| 5,569,370 | 10/1996 | Gomez | 205/560 |

FOREIGN PATENT DOCUMENTS

| 651439 | 12/1993 | Australia . |
| 654774 | 11/1994 | Australia . |

*Primary Examiner*—Donald R. Valentine
*Attorney, Agent, or Firm*—Evenson, McKeown, Edwards & Lenahan, P.L.L.C.

[57] ABSTRACT

An electrochemical apparatus and system for extracting and recovering metals from their compounds using electrochemical cells where the anolyte 10 is connected electrically to the catholyte 11 through an independent set of electrodes 13, 14 immersed in each electrolyte and connected to each other by a conductor 16. The specification details the application of this principle to commercial size cells and systems to extract metals from solutions, from ores in-situ, from ores in heaps and fixed beds, from fine metal concentrates dissolved either at the anode cell or in a separate leaching vessel. Alkaline electrolytes are also given for the extraction and recovery of nickel and copper from their oxide ores. A method for extracting gold from ores or residues is also included.

27 Claims, 13 Drawing Sheets

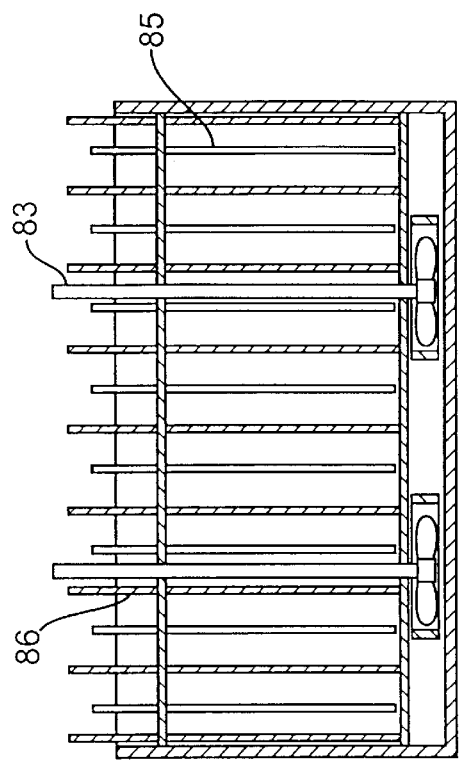
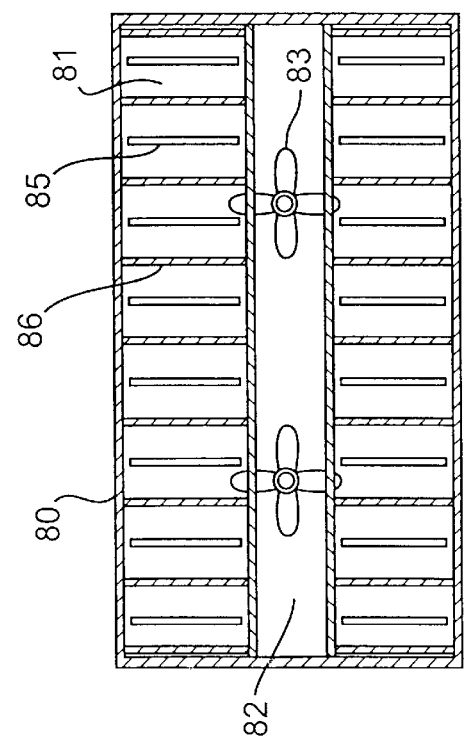
FIG. 7B
FIG. 7A

ELECTROCHEMICAL SYSTEM AND METHOD

This is a cip of U.S. patent application Ser. No. 08/318,782, filed on Oct. 3, 1994 now U.S. Pat. No. 5,569,370.

TECHNICAL FIELD

This invention concerns the electrochemical extraction and recovery at a commercial scale of base metals and precious metals from their sulphide ores, oxide ores, and alloys; and metals in process streams, by-products, and waste.

BACKGROUND OF THE INVENTION

The core of this invention lies in a new concept of an electrochemical cell which allows high reaction rates and separate anode sections and cathode sections disclosed in our Australian Patent No. 654774. This present invention details the commercial scale equipment and systems using the principles in our Australian Patent no. 654774.

This present invention addresses the situation of many electrolytic processes which work satisfactorily in a small scale but fail when applied to pilot plant or commercial scale plants.

The conventional electrochemical cell for carrying out oxicising and reducing reactions consists of an anode section and a cathode section separated by a diaphragm where ions produced at the anode must migrate through the diaphragm to the cathode to be reduced. This process is too slow and does not prevent impurities from co-depositing with the desired metal at the cathode.

PRIOR ART

The common method of connecting the anolyte to the catholyte is through a porous diaphragm or membrane common to the two solutions. The use of ion-exchange material or semi-conductors such as sodium silicate impregnated diaphragm have also been reported. This method of electric or electronic connection results in high resistance in the electron loop resulting in reduced reaction rates.

Commercial electrowinning of metals is carried out in cells where the anode and the cathode are immersed in the electrolyte and are about 100 millimeters from each other. The metal is deposited at the cathode but the oxidising power of the anode is lost through the generation of oxygen which is usually lost to the atmosphere.

Lately, the EMEW cell covered by Australian Patent 651439 (12 Feb. 1992) has been proposed which consists of a cathode cylinder of about 100 mm diameter and an anode tube through the centre. This electrolytic cell uses the well known principle of turbulence in a hydrocyclone with the electrolyte fed tangentially into the cathode cylinder. While the EMEW cell offers better agitation of the electrolyte compared to the conventional method, it still suffers from the fundamental defect of the conventional electrolytic cell that the opposing anode and cathode reactions are located in proximity to each other in the same container. Further, the EMEW cell is only workable when the metal to be recovered is already in solution.

BRIEF DISCUSSION OF THE INVENTION

For an electrochemical cell to function, there must be a complete loop of travel of the electrons through the power source and through the electrochemical cell. In this invention, the anolyte and the catholyte may be electrically connected by one of the following:

1. Solution connection through a common conductive wall, or
2. Solution connection through solution electrodes immersed in the anolyte and catholyte and connected by a conductor.

In one form therefore the invention is said to reside in an electrochemical metal recovery apparatus comprising: an anode cell, an anode electrode assembly in the anode cell, and a first solution electrode assembly in the anode cell, a cathode cell, a cathode electrode assembly in the cathode cell and a second solution electrode assembly in the cathode cell, an electrical connection between the first solution electrode assembly and the second solution electrode assembly, a direct current electrical potential source between the anode electrode assembly and the cathode electrode assembly, and means to transfer metal rich electrolyte from the anode cell to the cathode cell and means to transfer metal depleted electrolyte from the cathode cell to the anode cell.

In a preferred form of the invention the first solution electrode assembly and the second solution electrode assembly together comprise an electrically conductive wall between the anode cell and the cathode cell.

In an alternative preferred form of the invention the first solution electrode assembly comprises at least one carbon or conductive electrode and the second solution electrode assembly comprises at least one carbon or conductive electrode.

The preferred option of this invention is the use of solution electrodes as this provides large surface areas for high reaction rates and allows the anode section and the cathode section to be in separate containers. This is an advantage in many commercial processes, not only in segregating the opposing reactions at the anode and cathode, but allowing easy purification of the electrolyte before deposition of the metals.

The use of solution electrodes results in a wide variety of commercial applications of electrochemical processes.

The principle of this invention may also be applied to electroplating and galvanising and the chemical process industry.

In a further form the invention is said to reside in an alkaline electrolyte containing ammonia, ammonium sulphate or ammonium chloride, halite, the ion of the metal to be extracted and a catalyst such as other halide ions or boron compounds to be used in conjunction with any of the electrochemical metal recovery apparatus disclosed herein for the extraction of metals from their oxides, particularly for nickel, cobalt, and copper oxide ores.

In a further form the invention is said to reside in a process for the recovery of gold in an electrochemical metal recovery apparatus as disclosed herein wherein gold is extracted from a finely ground ore or from a residue of a previous electrochemical system, the gold containing material being re-pulped in brine to a pH of 4 to alkaline in a tank and passed to an absorption tower to absorb chlorine produced from the anode cells such slurry is then passed on to the anode cells operated to maintain a redox of about 700 to dissolve the gold, the leached slurry being passed to a liquid/solid separation stage, the redox potential of the gold bearing solution being reduced to about 500 by the addition of fresh ore or liquid streams of lower potential, gold then being recovered by precipitation on activated carbon or by electrolysis in cathode cells connected to the gold anode cells and the barren gold solution being then recycled to the re-pulping tank.

This then generally describes the invention but to assist with understanding reference will now be made to experimental investigations of processes according to this invention and preferred embodiments of the invention.

EXPERIMENTAL INVESTIGATIONS

Extraction of Metal from Solution

An experiment was conducted using a cathode cell of 35.7 mm ID by 230 mm long 316 stainless steel tube with PVC end caps and eight 6.35 mm OD and one 9.53 mm OD carbon rods as solution electrodes. The anode cell connected to the top of the cathode cell was a 36.8 mm OD×270 mm long PVC tube with eight 6.35 mm OD carbon rods as anode electrodes and one 9.53 mm OD carbon rod solution electrode. The electrolyte was 2.5 liters of demineralised water with 49 grams of copper sulphate and acidified to a pH of 2.5. A pump circulated the electrolyte through the cathode cell then to the anode cell at about 9.5 liters per minute. Temperature ranged from 33° to 37° C.

The first test was carried out to demonstrate the principle of connecting the catholyte and anolyte using solution electrodes connected by a copper wire rather than by electrical connection occurring through the solution.

The results were:

| CELL VOLTS | CELL AMPERES SOL. ELECTRODES NOT CONNECTED | CELL AMPERES SOL. ELECTRODES CONNECTED | CURRENT INCREASE (TIMES) |
|---|---|---|---|
| 1.00 | 0.01 | 0.05 | 4.0 |
| 1.50 | 0.015 | 0.12 | 7.0 |
| 2.00 | 0.02 | 0.33 | 15.5 |
| 2.50 | 0.03 | 0.78 | 25.0 |
| 3.00 | 0.03 | 1.50 | 49.0 |
| 3.50 | 0.04 | 2.52 | 62.0 |
| 4.00 | 0.05 | 3.78 | 74.6 |
| 4.50 | 0.06 | 5.59 | 92.2 |
| 5.00 | 0.07 | 6.98 | 98.7 |
| 5.50 | 0.08 | 8.39 | 103.9 |
| 6.00 | 0.09 | 10.46 | 115.2 |
| 6.50 | 0.11 | 11.92 | 107.4 |

It will be noted that there was a substantial increase in coil current when the solution electrodes were connected. The rate of current increase increased with voltage but the rate of increase diminished after 6.00 volts. These are important observations in the development of this concept.

Using the same set-up and with the solution electrodes connected with a copper wire current was passed through the cells at 3.3 volts for almost 3 hours. Copper sheet was deposited at the cathode and the results were:

| TIME MINUTES | Cu in SOLN Milligrams/L | SOLN pH | CELL AMPERES | CELL AMP-HRS | COPPER DEPOSITED Grams |
|---|---|---|---|---|---|
| 0 | 3,070 | 2.32 | 2.56 | | |
| 15 | | | 2.74 | | |
| 30 | | | 2.97 | | |
| 45 | | | 3.13 | | |
| 60 | 3,540 | 1.64 | 3.34 | | |
| 75 | | | 3.49 | | |
| 90 | | | 3.66 | | |
| 105 | | | 3.79 | | |
| 120 | 1,350 | 1.34 | 3.92 | | |
| 135 | | | 4.00 | | |
| 150 | | | 3.74 | | |
| 165 | | | 3.26 | | |
| 175 | 170 | 1.10 | 2.43 | 6.95 | 8.2279 |

The weight of copper deposited at the cathode was 11.8 grams which included copper deposited during the first test. Using Faraday's law for divalent copper, the current efficiency based on assay of the electrolyte indicate a current efficiency of about 99.95%.

The experiment demonstrated the principle of connecting the catholyte and the anolyte using solution electrodes connected by a conductor and that metal is deposited at the cathode. It is also shown that the electrochemical cell of the present invention can operate at high current efficiency even at very low concentration of metal in the electrolyte.

Experiment to Dissolve Copper-Cobalt Sulphide Concentrate

Limited resources and the unavailability of small pumps to handle hot corrosive slurries made this experiment difficult to carry out.

The anode cell of the apparatus consisted of a 115 mm ID×625 mm long polypropylene tube anode fitted with seven 19 mm OD×610 mm long half round carbon rods for the anode and a similar number of solution electrodes arranged in a circular pattern next to each other. Hot humidified air was introduced at the bottom through a polypropylene filter cloth at the rate of 6 liters per minute. The cathode cell fitted with a silica tube heater consisted of a two compartment 90 mm×200 mm×230 mm deep polypropylene box with a circulation well and fitted with a glass propeller driven by a variable speed power drill mounted on a stand. The cathodes were four pieces of 60 mm×200 mm immersed length×1.0 mm thick 316 stainless steel plates. The solution electrodes were 60 pieces of 6.35 mm OD carbon rods arranged 10 in line between each of the cathode plates. A 400 mm diameter polypropylene cone with four silica tube heaters was used as a thickener between the anode cell and the cathode cell. All the equipment was insulated as the operating temperature was 85 to 90 degrees Celsius.

The experiment used 474 grams of a 30.4% copper, 0.096% cobalt sulphide concentrate. The electrolyte was an acidified halite copper sulphate solution containing about 15 grams of copper per liter. The pH was kept below 2.50. During the experiment, the thickener underflow and the cathode cell overflow were pumped to the anode cell. Leached slurry overflowed from the anode cell to the thickener. Thickener overflow fed into the cathode cell. Catholyte flowed from the constant level tube of the cathode cell and was pumped to the anode cell.

Data on the test were as follows:

| TIME Hours | CELL Volts | CELL Current | ANODE pH | CATHODE pH |
|---|---|---|---|---|
| 01:00 pm | 1.10 | 6.86 | 2.30 | — |
| 02:00 | 1.10 | 4.27 | 2.21 | 2.03 |
| 03:00 | 1.40 | 4.75 | 2.29 | 2.01 |
| 04:00 | 1.80 | 7.30 | 2.32 | 2.12 |
| 05:00 | 2.19 | 11.31 | 2.18 | 1.96 |
| 06:00 | 2.01 | 10.71 | 2.28 | 1.97 |
| 07:00 | 2.20 | 11.98 | 2.31 | 2.01 |
| 08.00 | 2.67 | 11.55 | 2.14 | 1.85 |
| 09:00 | 2.75 | 13.37 | 1.96 | 1.78 |
| 10:00 | 2.75 | 13.82 | 1.83 | 1.70 |
| 11:00 | 2.75 | 14.09 | 1.75 | 1.67 |
| 12:00 | 2.75 | 14.29 | 1.26 | 1.21 |
| 01:00 | 2.75 | 14.52 | 1.43 | 1.44 |

During the test, it was observed that the thickener was too small for the required pump flow rate and fine sulphide and reaction products overflowed into the cathode cell. After the test, it was observed that solids had settled on the slope of the thickener, at the cathode, in the slurry pump and in the pipes. There was a substantial amount of solids which did not participate in the reaction.

Bearing this experimental handicap in mind, only 60.19 percent of the copper and 34.24 percent of the cobalt was extracted. The current efficiency based on divalent copper extracted from the concentrate was only 50.68%. The copper deposited assayed 99% copper and 25 ppm cobalt.

This trial experiment has demonstrated that the principle of the electrochemical apparatus of the present invention will dissolve the solids at the anode and deposit the metal at the cathode. Larger equipment is required to identify the important variables of this concept and optimise the system. Apart from the electrolyte, it appears that the spacing of electrodes, the shape and the current density of electrodes are important for the efficiency of the apparatus.

To test the difference between the cell of the present invention and the EMEW Cell discussed in the prior art, a parallel test was carried out on a copper sulphate solution using the same 35.7 mm ID 316 SS tube×230 mm long as in the cell of the present invention and a 9.53 mm OD carbon rod as the anode through the centre of the SS tube. The experimental data and results were:

|  | TIME Hr:Min | ENDING COPPER mg/liter | CURRENT EFFICIENCY Percent | ENERGY EFFICIENCY WattHrs/Gram |
|---|---|---|---|---|
| INVENTION | 2:55 | 170 | 99.95 | 2.79 |
| EMEW | 3:25 | 350 | 72.89 | 3.82 |

These results show that the apparatus of the present invention is capable of extracting dissolved metal from solution, to a lower concentration and energy consumption, and at a higher current efficiency.

BRIEF DISCUSSION OF THE DRAWINGS

Figure 3A:
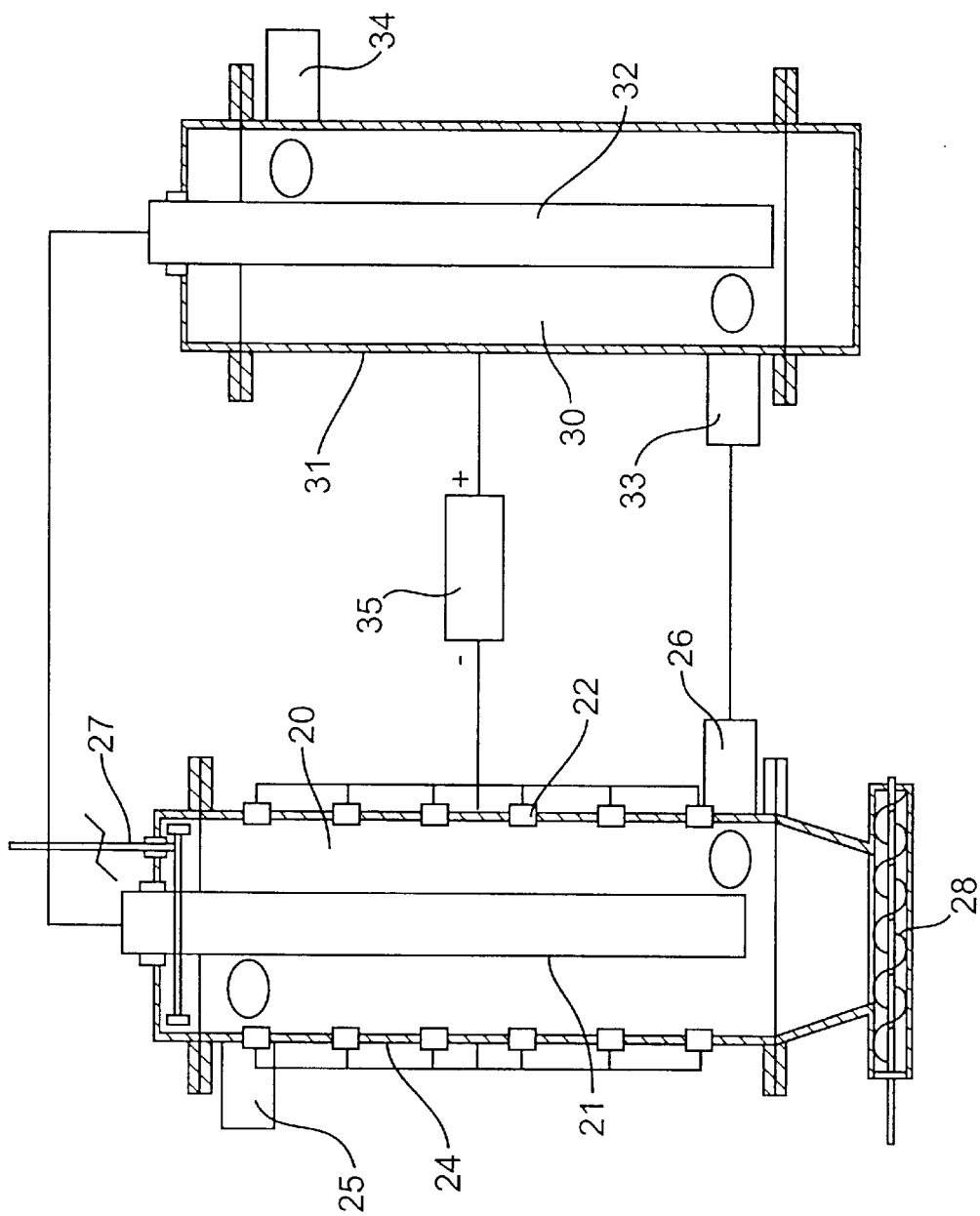

FIG. 3A and B show embodiments of an electrochemical apparatus of the present invention.

Figure 4B:
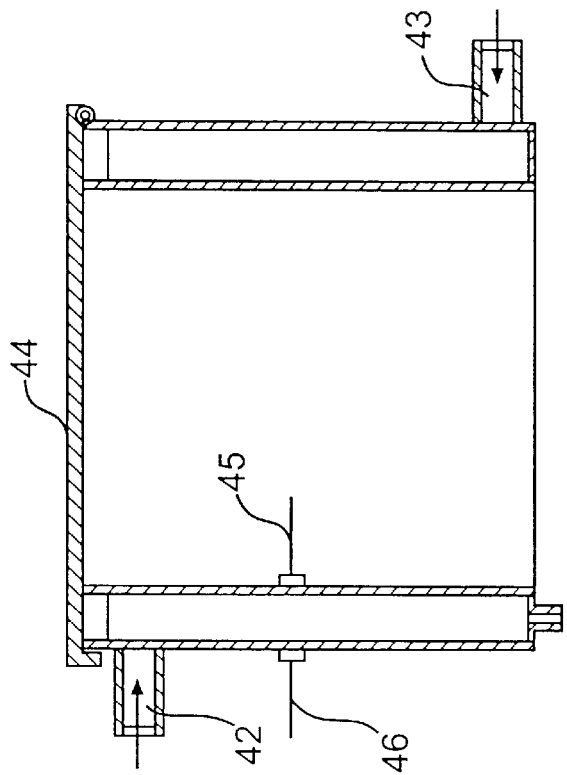
Figure 4A:
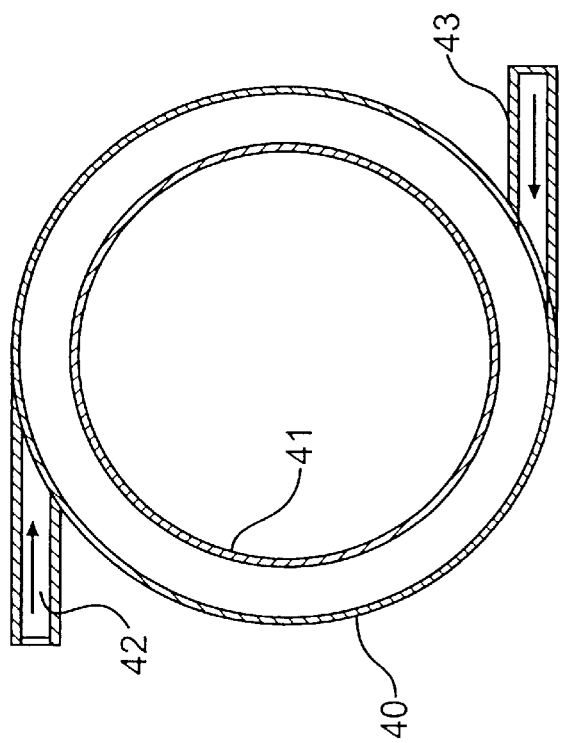

FIGS. 4A, B and C show alternative embodiments of a electrochemical cell of the present invention.

Figure 5A:
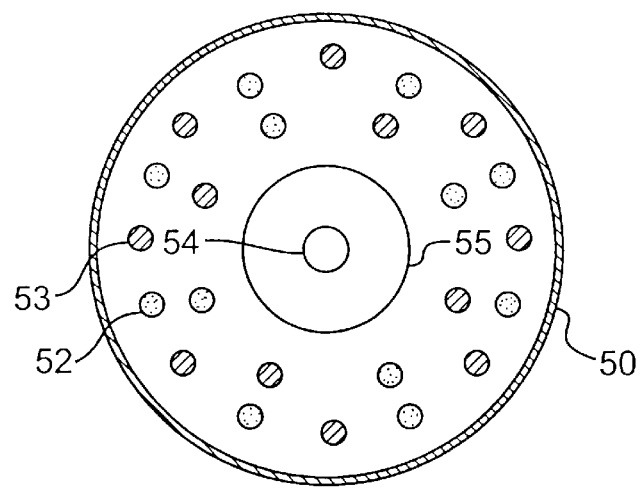
Figure 5B:
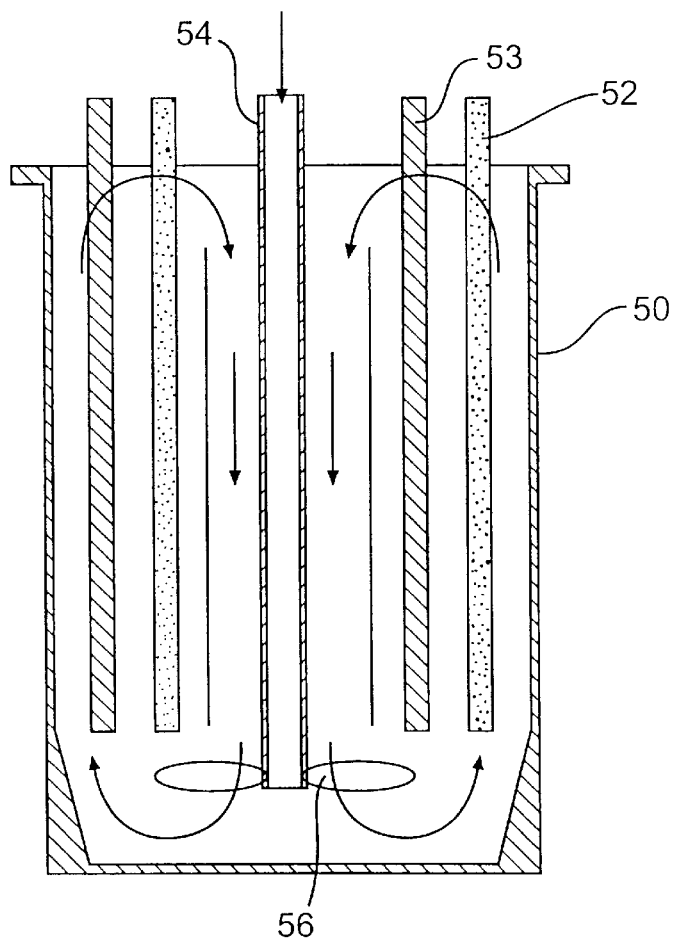

FIG. 5A and B show one embodiment of an anode cell of an electrochemical apparatus of the present invention.

Figure 6:
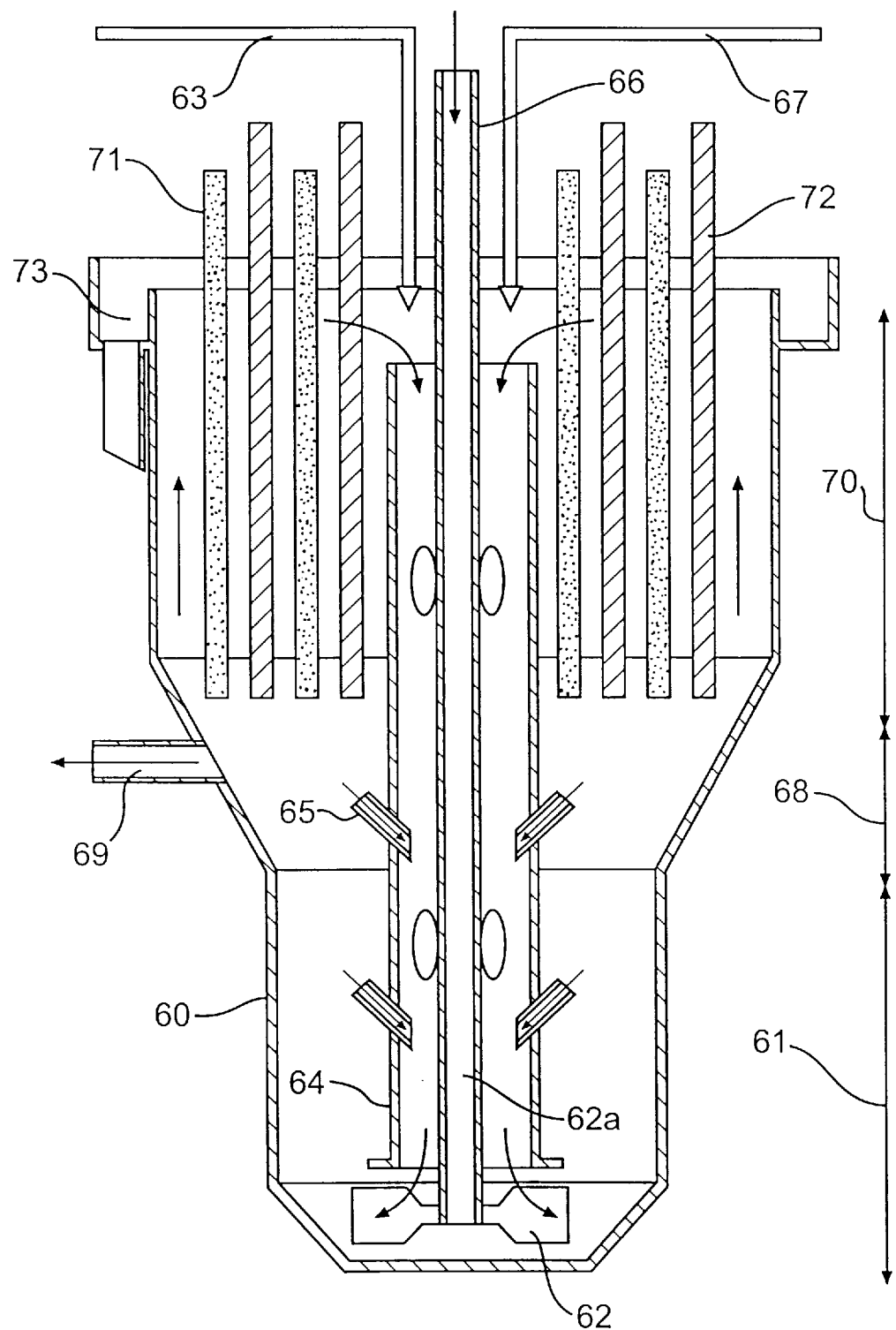

FIG. 6 shows an alternative embodiment of an anode cell of an electrochemical apparatus of the present invention.

FIG. 7A, B, and C shows various views of one embodiment of a cathode cell of an electrochemical apparatus of the present invention.

Figure 8:
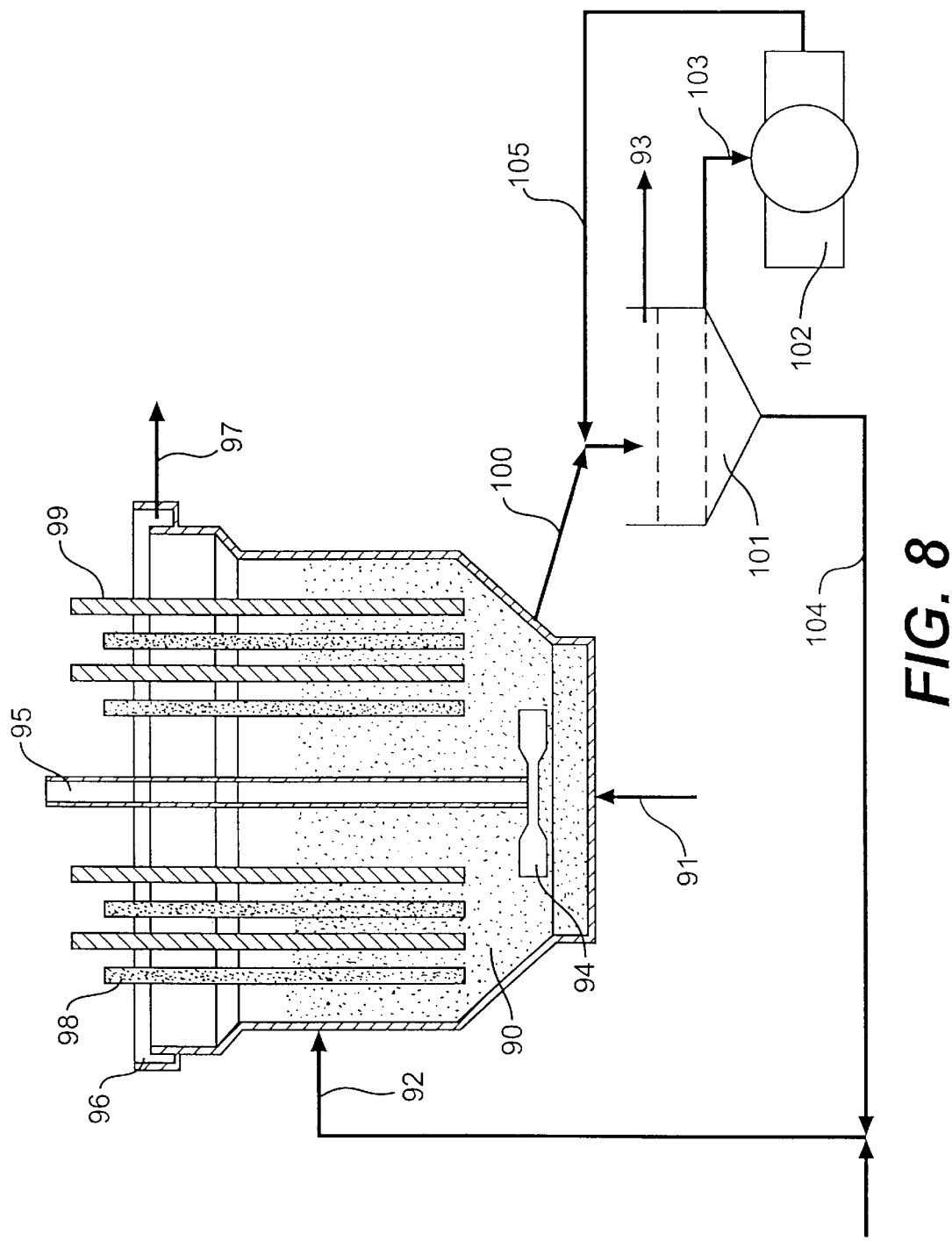

FIG. 8 shows an alternative embodiment of a cathode cell of an electrochemical apparatus of the present invention.

Figure 9A:
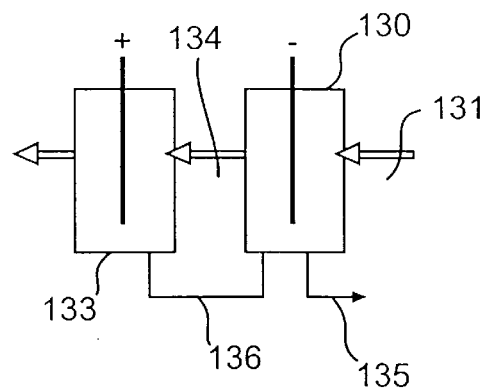

FIG. 9A, B, C, D, E and F show alternative embodiments of a electrochemical apparatus of the present invention for various metal extraction situations.

Figure 10:
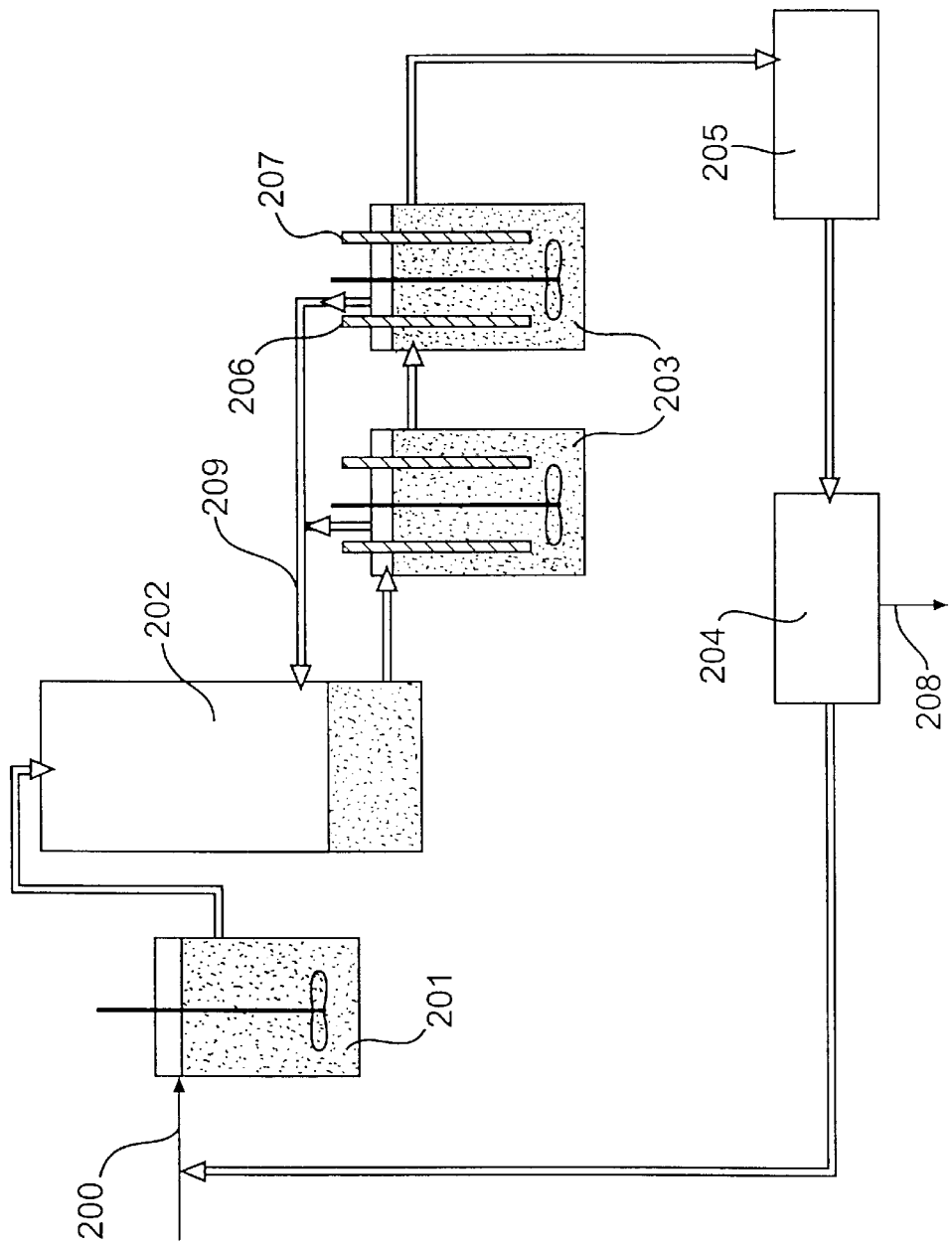

FIG. 10 shows an alternative embodiment of a electrochemical apparatus of the present invention particularly adapted for the extraction of gold.

DETAILED DISCUSSION OF THE DRAWINGS

Figure 1:
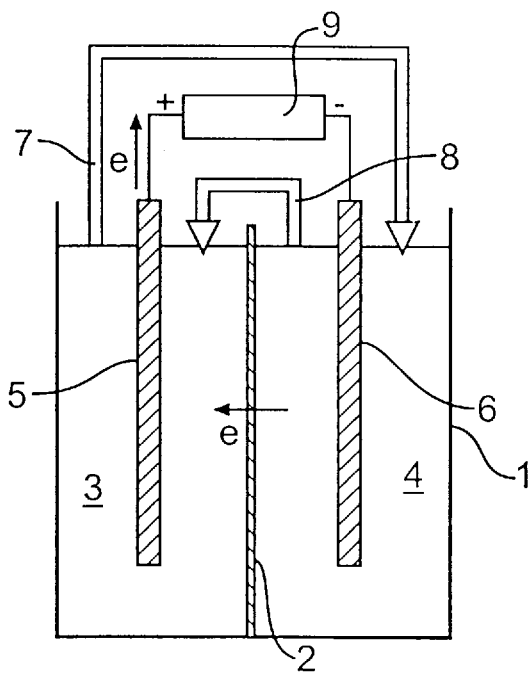
FIG. 1 shows a schematic view of an electrochemical apparatus of the present invention utilising a diaphragm or conductive wall between the anode cell and the cathode cell.
Figure 2:
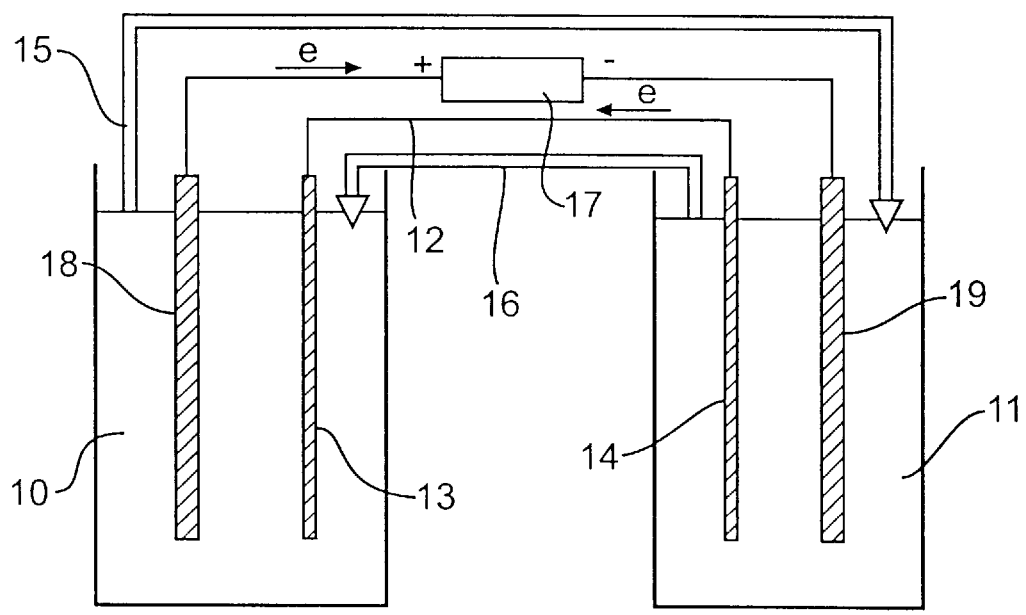
FIG. 2 shows a schematic view of an electrochemical apparatus of the present invention utilising solution electrodes and an electrical connection between the anode electrodes and the cathode electrodes.

FIG. 1 and FIG. 2 are presented to illustrate the principle of this invention where the anolyte and the catholyte are electrically connected.

FIG. 1 shows a schematic view of an electrochemical apparatus of the present invention utilising a conductive wall between the anode cell and the cathode cell. A tank 1 is divided by an electrically conductive wall 2 into an anode cell 3 and a cathode cell 4. An anode 5 is in the anode cell 3 and a cathode 6 is in the cathode cell 4. The first solution electrode and the second solution electrode together are formed by the conductive wall 2. A flow path 7 for rich electrolyte is provided from the anode cell to the cathode cell and a flow path 8 is provided for spent or depleted electrolyte from the cathode cell to the anode cell. A DC electric potential source 9 is connected between the anode 5 and the cathode 6. Regardless of dissolution of the metal inside the anode cell or outside in a separate vessel, the rich electrolyte is always fed into the cathode cell.

FIG. 2 shows a schematic view of an electrochemical apparatus of the present invention utilising solution electrodes and an electrical connection between the anode electrodes and the cathode electrodes. In this embodiment the anode cell 10 and cathode cell 11 are separate and solution electrical connection is provided by electrical connection 12 between first solution electrodes 13 in the anode cell and second solution electrodes 14 in the cathode cell 11. A flow path 15 for rich electrolyte is provided from the anode cell to the cathode cell and a flow path 16 is provided for spent or depleted electrolyte from the cathode cell to the anode cell. A DC electric potential source 17 is connected between the anode 18 and the cathode 19. Dissolution of the metals may take place in anode cell 10 or in a separate leaching vessel between anode cell 10 and cathode cell 11.

Various commercial size anode and cathode cells suitable for the electrochemical apparatus of the present invention are possible using the concept of electrically connecting the anolyte and catholyte and are enumerated below.

A small cylindrical electrochemical apparatus of the present invention is suitable for small streams to extract metal from solutions. These may be from operations such as heap or in-situ leaching or from process streams of refineries and process plants.

Figure 3B:
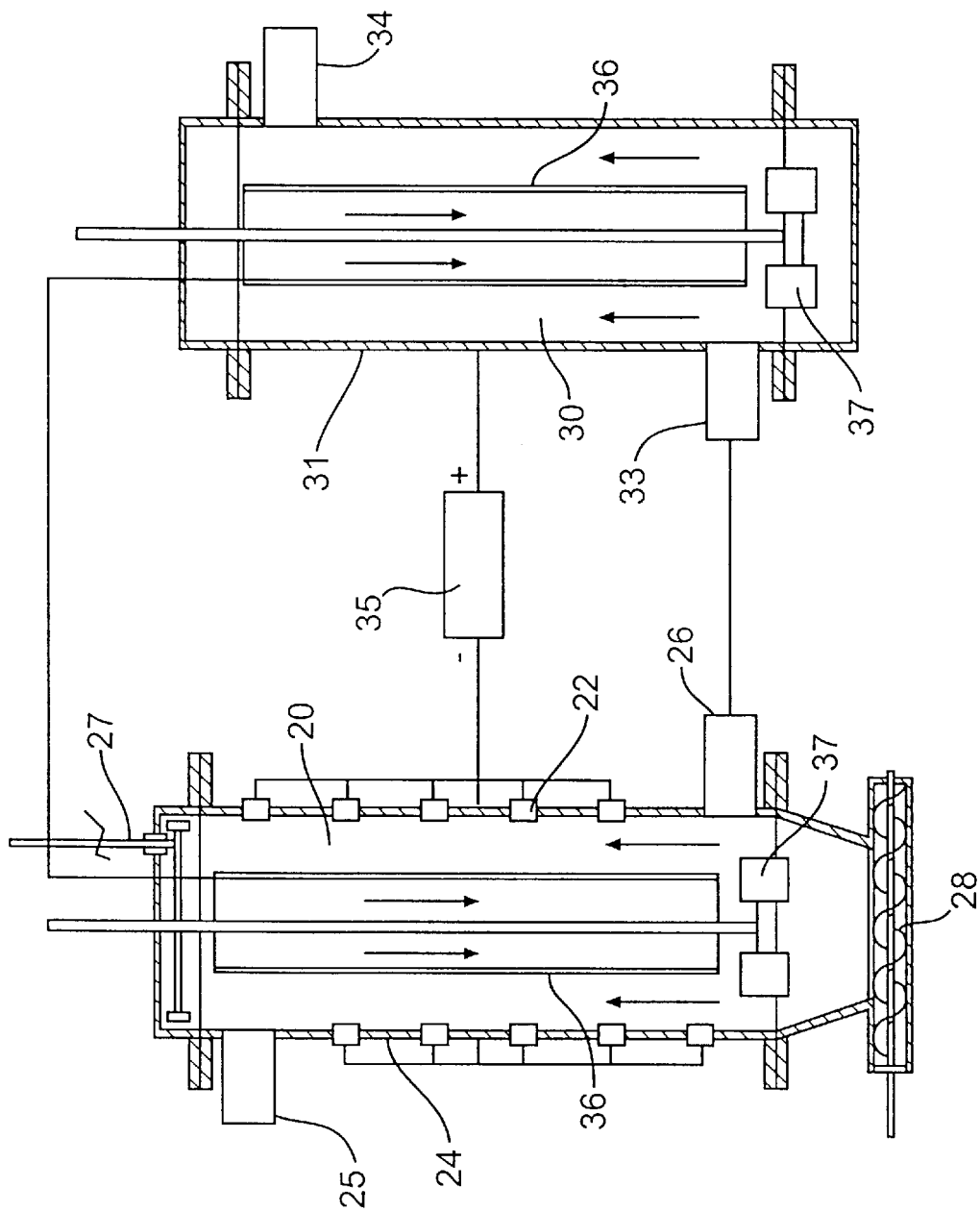

FIG. 3A and 3B show arrangements of electrochemical apparatuses according to this invention which are suitable for small size processes.

Shown in FIG. 3A is a cathode cell 20 where metal powder is produced from the feed solution. The solution electrode 21 is at the centre and cathode buttons 22 are embedded on a non-conductive cylindrical tank 24. Feed solution is fed at one end tangentially through an inlet pipe 25 and exits at the other end through an outlet pipe 26 with the metal deposited on the cathode buttons 22 and forming dendrites which can be regularly dislodged by means of a release device 27 and collected from the bottom of the cylinder by means of a extractor 28 such as an auger. In an alternative arrangement a metal plate deposit can also be produced using a finished plate cathode as the cylinder wall 24. Such a cathode plate 24 would have two oppositely positioned vertical insulators (not shown) for each of removal of the plate deposit.

Several of these cathode cells may be connected in series before the lean solution is passed on to the anode cell 30 which consists of a cylindrical outer plate anode 31 and a solution electrode 32 through the centre. Feed solution is fed at one end tangentially through an inlet pipe 33 and exits at the other end through an inlet pipe 34. The solution may flow through several of these anode cells in series. DC power source 35 provides the electrical potential between the anode 31 and the cathode 22.

Sufficient agitation from tangential entry is generally limited to small diameter cylinders. This is a limitation of the tangential entry concept and becomes exacerbated when electrolyte flow rates are small.

Shown in FIG. 3B is an alternative embodiment in which the components with the same function as in FIG. 3A have the same reference numbers. In this embodiment there is added a circulation tube 36 in each of the cathode and anode sections and there is used agitators 37 to provide flow of electrolyte in each cell. The circulation tubes 36 act as the respective solution electrodes 21 and 32.

This electrochemical apparatus may be used for plants with a metal production of about 1 to 10 tonnes per day. Typically, the diameter of each of the cells may range between 200 and 500 millimeters and the length from 2 to 3 meters.

A large cylindrical cell suitable for either the anode cell or the cathode cell of the electrochemical apparatus of another embodiment of the present invention is shown on FIG. 4A and B and provides much greater active areas for greater capacity for plants producing more than 10 tonnes of metal per day.

The cell comprises an annular body in which the outer surface 40 provides the cathode or anode wall and the inner wall 41 provides the respective solution electrode. It is possible to add another inner ring (not shown) to act as another cathode or anode, further increasing the capacity of the cell. Tangential inlets 42 and outlets 43 may be provided to give turbulent flow and good mixing in the cells. A non-conductive lid 44 is used in the cell and electrical connections are provided to the anode/cathode and the solution electrode.

Typically, the cells may be 1 to 3 meters in diameter and about 1.5 to 3.0 meters in depth. Metal powder or metal plate may be produced. Vertical insulators may be installed on the cathode if plates are produced to make removal of the plate deposit easy.

Figure 4C:
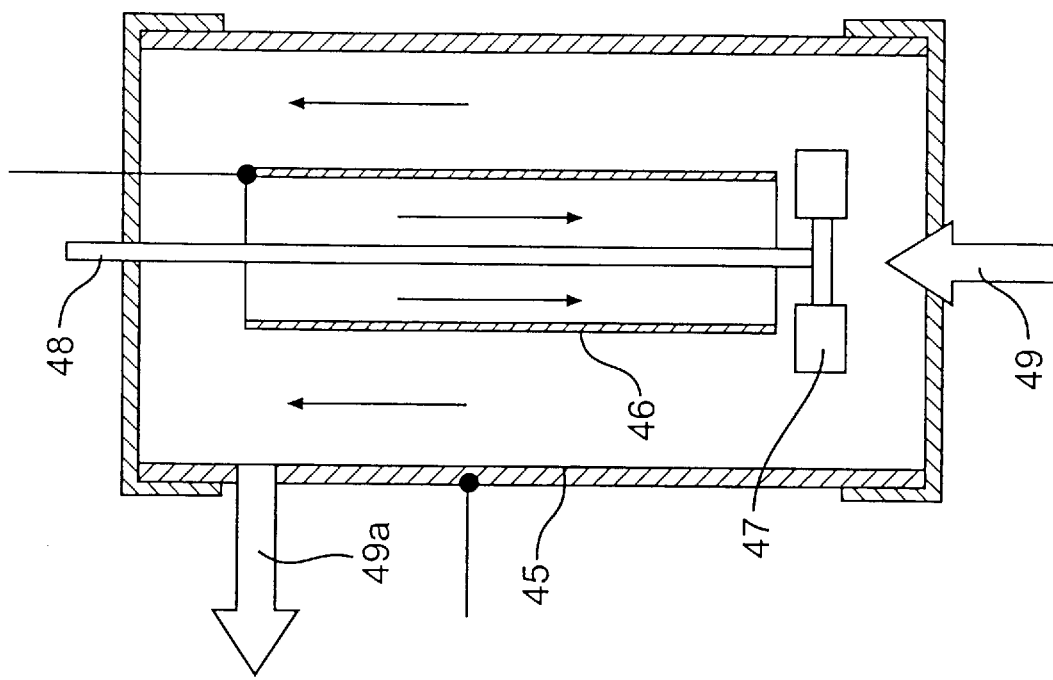

FIG. 4C shows an arrangement of a cell which may be an anode cell or cathode cell. The cylindrical outer wall 45 acts as the cathode or anode respectively and the circulation tube 46 acts as the respective solution electrode. An agitator 47 driven by drive shaft 48 maintains circulation in the cell. Electrolyte enters through inlet 49 and exits at outlet 49a.

This style of cell design may be used for small or large flow rates of electrolytes.

FIG. 5A and B show a cylindrical anode cell 50 provided with a mechanical agitation by an impeller 56 driven by shaft 54 which extends down a central circulation tube 55 for handling slurry. Solution electrodes 52 and anodes 53 extend into the anode cell. While electrode rods are shown, it is also possible to use concentric plates or mesh of suitable conducting material as solution electrodes and anodes. Hot air is provided through impeller shaft 54 for heating and for taking part of the reaction. In applications where the solids are fine enough, it is also possible to use only air for agitation with the air supplied through a fine mesh at the bottom of the tank. The tank may be constructed of non-conducting material such as plastic or fibre glass.

This type of anode cell may generally be used for large plants of more than 100 tonnes of metal per day and may be connected in series in a step down arrangement. They may have a diameter of about 4.0 to 8.0 meters and a height of 6.0 to 10.0 meters.

In some processes, contact between the solids of the slurry introduced into the anode cell and the electrodes is not desired or harmful. FIG. 6 shows an anode cell where the solids are not in contact with the electrodes. The anodes act on the solution and the reaction occurs between the solids and the solution.

The anode cell comprises a tank 60 having three zones vertically one above the other. The lowermost slurry zone 61 is a slurry reaction zone in which slurry is agitated by an agitator 62. Air or gas is fed through a hollow agitator shaft 66 to heat and react with the slurry in the slurry reaction zone. Slurry 63 is fed in through a feed tube 64 along with electrolyte solution 67 to the slurry zone 61. Circulation pipes 65 are provided extending from the slurry zone 61 into the feed tube 64 and are angled at such an angle that slurry is drawn by the flow into the tube 64 into the tube and is recirculated.

Above the slurry zone is a disengagement zone 68 in which solids in the slurry are separated from the metal enriched electrolyte solution. Leached slurry is removed from the disengagement zone 68 through removal pipe 69.

The disengagement zone 68 in this embodiment is of a frustoconical shape so that flow of slurry is slowed down to assist with the separation of solids and solution.

In the uppermost electrolytic zone 70 electrolyte solution reacted with the slurry is oxidised by electric potential provided between anodes 71 and solution electrodes 72. There are a plurality of the anodes 71 and the solution electrodes 72 in the electrolytic zone 70. An overflow launder 73 is provided at the top of the electrolytic zone 70 to remove oxidised enriched electrolyte solution to a cathode cell (not shown).

This arrangement of anode cells according to this embodiment may be installed in series and an advantage is to travel the solids in countercurrent motion to the electrolyte solution, which would result in lower values of metals in the tailings and higher tenor of metals in the electrolyte solution.

Figure 7C:
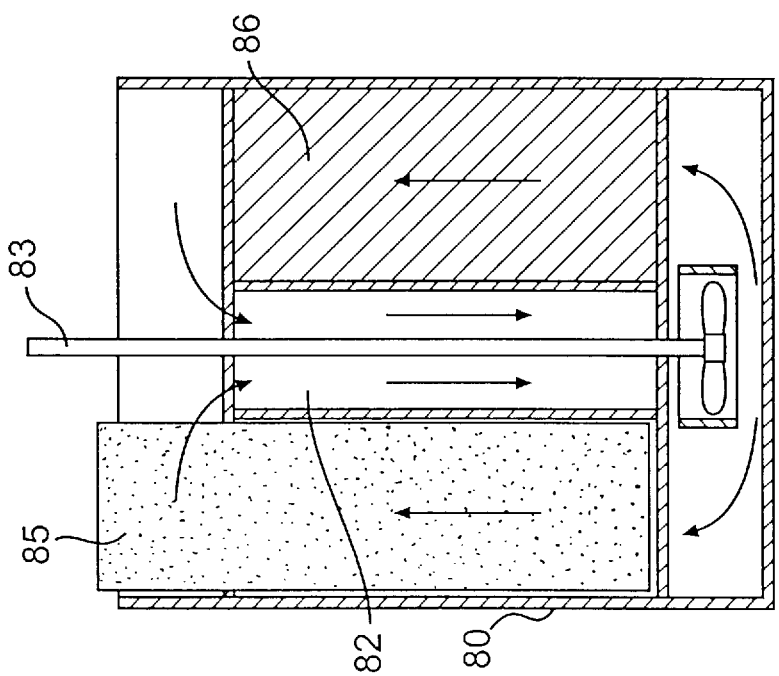

Larger plants require larger capacity cathode cells and cubical cells as shown on FIG. 7 may provide this. FIG. 7A is a plan view, FIG. 7B is an elevation view and FIG. 7C is a side view of such a cell.

In this embodiment the cathode cell 80 is comprised of a number of individual cells 81 arranged on two sides of a central circulation trough 82 to make efficient use of mechanical agitation provided by agitators 83. Each individual cell 81 has a metal plate cathode 85 and is separated from its immediate neighbouring individual cell by a solution electrode 86. Electrolyte solution flow within the cathode cell is essentially down the central circulation trough spreading at the bottom of the cell to flow up either side in each individual cell and then to flow across the top of the cell and back down the central circulation trough. Fresh oxidised enriched electrolyte solution is fed into the cell and lean reduced electrolyte solution is withdrawn from the cell.

In this embodiment metal is deposited on the cathode as a metal plate. The metal plate product is a desired option in the metal fabrication industry. Stainless steel cathode blanks and conventional stripping machines may be used in conjunction with these cells.

A large surface area cathode is required to remove small concentrations of metals from a solution or from waste streams. In copper plants, the removal of small quantities of silver before copper deposition is important to produce the high quality electrolytic copper. A fluidised bed cathode as shown on FIG. 8 will provide a very large cathode area.

The cathode cell comprises a non-conductive tank 90. Oxidised enriched electrolyte solution is fed in at the bottom of the tank 90 through pipe 91 and fine metal powder is fed in at the side of the tank 90 through line 92. The metal powder is kept in suspension by an agitator 94 driven by shaft 95. Depleted electrolyte solution is removed in line 97 from an overflow launder 96 around the top of the tank 90. Cathodes 98 and solution electrodes 99 extend down into the fluidised metal powder.

Metal powder is removed from the tank in line 100 and screened in a screen 101. Coarse metal product 93 is removed from the top of the screen 101 as product, medium size powder is fed to a crusher 102 by line 103 and fines are recycled to the cathode tank. Crushed product from the crusher 102 is returned on line 105 to the screen 101 for re-screening.

In another embodiment of this fluidised bed, the lower portion of tank 90 containing the fluidised metal powder may be a conductor and act as the cathode with only the solution electrodes 99 extending into the fluidised bed.

In practice, several fluidised bed cathodes of this embodiment may operate in series and be serviced by a single screen 101 and crusher 102 for the metal product.

ELECTROLYTES

Several types of electrolyte may be used with the electrochemical apparatus of the present invention. These may be aqueous, organic or semi-organic, acidic or alkaline. Some of these solutions are:

1. Aqueous acidified metal sulphate with or without ferric ions
2. Acidified sodium chloride solution with metal ions and ferric ions.
3. Electrolyte similar to item 2 above but with another halide such as bromine to form a more powerful oxidant compound of bromine and chlorine.
4. Alkaline electrolyte with the cyanide complex, principally for the extraction of gold and silver.

Our laboratory experimental work indicates that acid electrolytes are not ideal for oxide ores such as laterite ores containing nickel oxide. The acid consumption to maintain the proper pH of the electrolyte becomes large and process control becomes difficult.

The following alkaline electrolyte is included in this invention to be used for some sulphide ores but is more for use with oxide ores of nickel and copper:

1. Ammonia-ammonium sulphate with halite and the metal ion,
2. Ammonia-ammonium chloride with halite and the metal ion.

These alkaline electrolytes may also contain catalysts such as boron compounds or other halides such as bromine. Some reactions such as in the extraction of precious metals may require oxygen at the anode.

An example of the reactions for a nickel oxide ore using ammonium sulphate is:

Anode Reactions:

$$NiO+(NH_4)_2SO_4+H_2O \rightarrow NiSO_4+2NH_4OH \qquad (1)$$

$$NiSO_4+8NH_4OH \rightarrow Ni(NH_3)_6^{++}+(NH_4)_2SO_4+7H_2O+1/2\ O_2 \qquad (2)$$

Cathode Reaction:

$$Ni(NH_3)_6^{++}+2e+6H_2O \rightarrow Ni^0+6NH_4OH \qquad (3)$$

A similar type of reaction can be postulated for the extraction of copper from copper oxide or carbonate ores.

These alkaline electrolytes are desirable because the alkaline component is regenerated at the cathode so that theoretically the reagent consumption is zero. The alkaline electrolyte also removes impurities such as iron and bismuth from the solution.

The electrochemical apparatus of the present invention may be used to extract metal from solutions or from metal ores and compounds in commercial scale in a range of situations.

These are diagrammatically shown on FIG. 9A to FIG. 9F. The cells used may be any of those described in FIG. 3 to FIG. 8 using the solution electrodes.

FIG. 9A shows the removal of metal ions from solution. This is the simplest system where metal ions are to be removed from a liquid stream such as from waste streams from a process plant or from mine liquors containing metals such as copper.

A solution with metal ions in it is fed into a cathode cell 130 through line 131 and the metal depleted solution is then transferred to the anode cell 133 by line 134 while the metal deposit is removed through line 135. A solution electrical connection 136 is provided between the cathode cell 130 and the anode cell 133.

If a large area of the cathode is required, the fluidised bed cathode cell may be used.

Figure 9B:
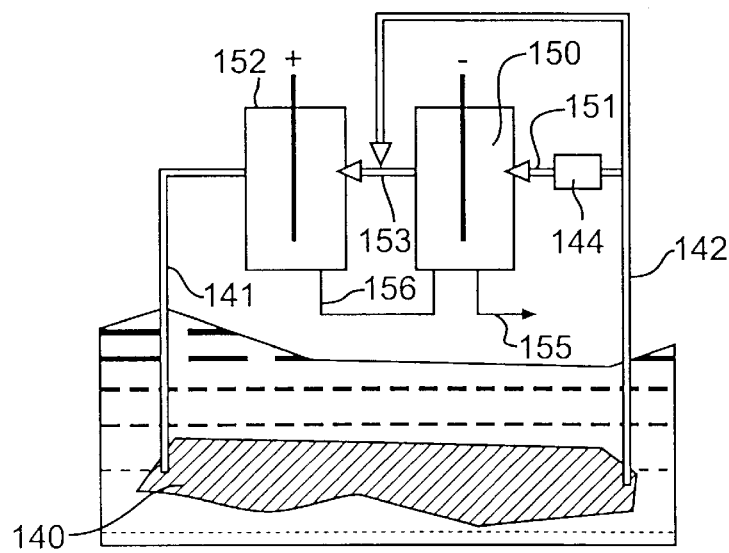

FIG. 9B shows the recovery of metals from ores in situ. Often due to environmental or economic grounds, the only way to extract metals from a low grade or deep deposit is by leaching in situ as shown on FIG. 10B.

Regenerated leach solution is passed underground through line 141 and percolated through a broken underground orebody 140 and the rich solution is brought to the surface through line 142 and purified in purification stage 144 if required such as by pH control, solvent extraction or cementation. Some of the solution 142 may be by-passed to the anode cell to maintain the required metal ion concentration in 141.

The rich solution with metal ions in it is fed into a cathode cell 150 through line 151 and the metal depleted solution is then transferred to the anode cell 152 by line 153 while the metal deposit is removed through line 155. A solution electrical connection 156 is provided between the cathode cell 150 and the anode cell 152.

Metal in solution is recovered at the cathode where acid is produced in acid electrolyte or ammonia if ammonia electrolyte is used or cyanide ions if alkaline cyanide electrolyte is used. The reduced solution is fed to the anode where active ions such as ferrous and cuprous ions (if present) are oxidised, thereby regenerating the active leaching agents.

This system offers an important advantage in leaching low grade copper ores in situ. These deposits usually contain more primary copper sulphide such as chalcopyrite than heap leached ores which are closer to the surface and are more oxidised. An acidified halite copper/ferric sulphate electrolyte using the system would be more effective than the conventional process where only acid is regenerated at the cathode, leaving the primary sulphide virtually untouched. In this system using aqueous halite copper/ferric sulphate electrolyte, the following reactions are proposed:

At the cathode:

$$CuSO_4+2e \rightarrow Cu+H_2SO_4 \qquad (4)$$

At the anode:

$$2Fe(II)-2e \rightarrow 2Fe(III) \qquad (5)$$

$$2Cu(I) - 2e \rightarrow 2Cu(II) \tag{6}$$

At the ore deposit in situ:

$$CuFeS_2 + 3Cu(II) \rightarrow 4Cu(I) + Fe(II) + 2S \tag{7}$$

$$CuFeS_2 + 2Cu(I) \rightarrow CuS + Cu_2S + Fe(II) \tag{8}$$

$$CuS + Fe(III) \rightarrow Cu(I) + Fe(II) + S \tag{9}$$

This system offers the best hope for leaching economically low grade copper sulphide ores in situ using an acidified halite copper sulphate solution or an ammonia-ammonium sulphate solution for a copper carbonate or oxide ore deposit. Extraction may be enhanced using catalyst such as halide halex or boric acid.

Extraction of copper from heaps and dumps has become commonplace since the Bluebird Mine was first established in the late fifties. Gold heap leaching is now also on the rise. An aqueous copper sulphate solution with or without the use of bacteria is the lixiviant. Solvent extraction is used to extract the copper into a pure electrolyte where copper cathodes of high purity are produced by electrowinning. In such a prior art system the oxidation power of the anode is wasted as is oxygen lost to the atmosphere and only the acid is regenerated at the solvent extraction stage. This conventional system works sufficiently well if the copper minerals in the heap are oxide or secondary.

Figure 9C:
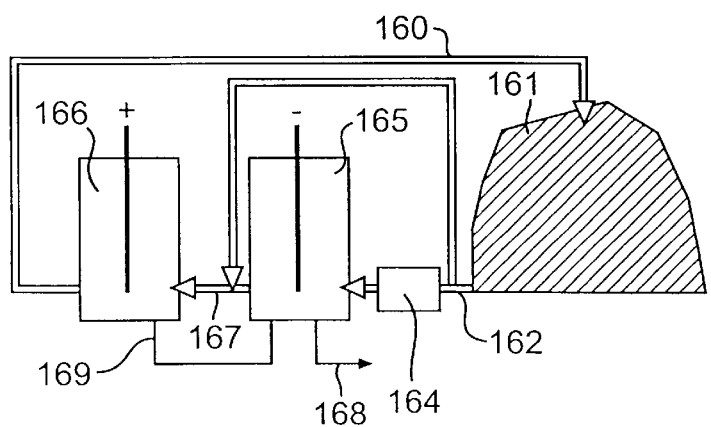

FIG. 9C shows the extraction of metal values from heaps or dumps. The system shown on FIG. 9C would offer more leaching power by oxidising the ferrous ions to ferric ions at the anode and would assist in dissolving native copper and secondary copper minerals such as chalcocite. In effect, the anode will replace the function of some bacterial processes where ferric ions are produced.

Regenerated leach solution is passed through line 160 and percolated through a heap or dump of ore 161 and rich solution is collected through line 162 and purified in purification stage 164 if required such as by pH control, solvent extraction or cementation. Some of solution 162 is by-passed to the anode to maintain the required metal ion concentration in solution 160.

The rich solution with metal ions in it is fed into a cathode cell 165 through line 162 and the metal depleted solution is then transferred to the anode cell 166 by line 167 while the metal deposit is removed through line 168.

A solution electrical connection 169 is provided between the cathode cell 165 and the anode cell 166.

At present, a solvent to extract cuprous ions from solution has not yet been developed. If an aqueous halite copper/ferric sulphate solution is used in the process shown in FIG. 9C, the position of the anode and the cathode cells are interchanged so that cupric ions are produced for the solvent extraction stage which wold be located after the anode cell.

For small copper plants, it may be possible to produce a sufficiently pure copper cathode without a solvent extraction stage when using the small cylindrical cells according to this invention. The conditions may be established by testing each application.

Figure 9D:
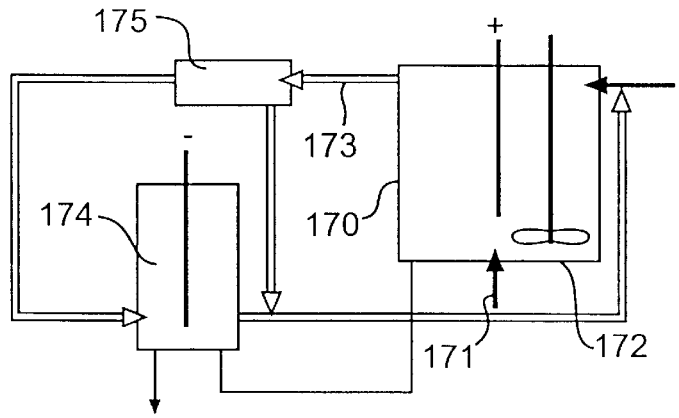

FIG. 9D shows the extraction from fine minerals or alloys. Fine minerals or alloys are best leached in an anode cell 170 according to this invention where air/oxygen 171 and heat is added. Agitation 172 is supplied mechanically or by air. Some of the solution 173 is by-passed to the anode cells before purification to maintain the strength of the active ions in the anode cell 170. There may be a series of anode cells 170 and cathode cells 174 and reaction containers 175 after the anode cells to complete the anode reactions. Purification between the anode cell and the cathode cell may include liquid/solid separation using thickeners and filters, or filters alone. Purification may also include any of the following conventional processes—solvent extraction: pH control to eliminate impurities such as base metals, iron, bismuth, cadmium; cementation; electrolysis; ion exchange.

Figure 9E:
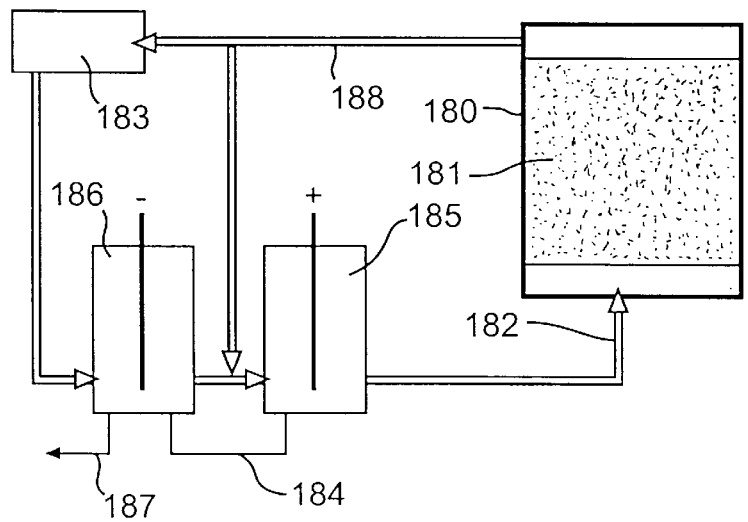

FIG. 9E shows a fixed bed system for extraction of metals from ores. A fixed bed system is suitable for processing medium grade ore. The ore 181 may be generally crushed to finer size than heap leaching and placed into large cubical or cylindrical containers 180. The electrolyte 182 floods the container and flows through the crushed ore 181. Some of electrolyte 188 is by-passed to the anode and the rest is purified in a purification stage 183 as in the heap leach operation before being passed to the cathode and anode stages as discussed earlier. An electrical connection 184 connects the solution electrodes in the anode cell 185 and the cathode cell 186. Metal is recovered through line 187.

Figure 9F:
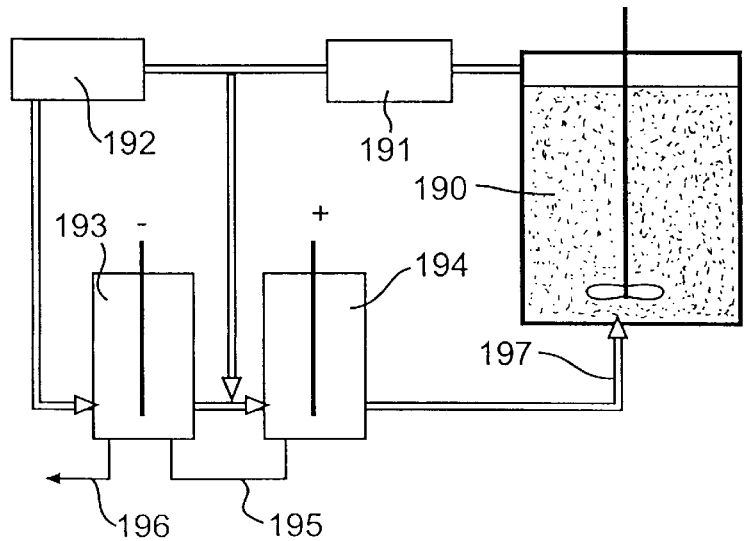

FIG. 9F shows a separate slurry vessel system. This system is suitable where the solids are fast leaching. The system may be a batch operation or continuous operation, and may consist of one or several slurry vessels 190. In a continuous process, fresh solid feed is added continuously to the first leaching vessel. The method of purification and the cathode and anode stages is the same as described in FIG. 9D. The leached slurry first undergoes solid liquid separation 191 and then purification 192 before going to the cathode cell 193. Depleted electrolyte is regenerated in the anode cell 194 before being reused in the slurry vessel 190. An electrical connection 195 connects the solution electrodes in the anode cell 194 and the cathode cell 193. Metal is recovered through line 196.

FIG. 10 shows a gold extraction process for extracting gold either from a gold ore or from residue of copper concentrates utilising the electrochemical apparatus of the present invention. Many copper sulphide concentrates contain significant amount of gold which must be recovered efficiently with the copper. Gold is not extracted by the usual electrochemical systems as the redox potential of the electrolyte is raised only to about 500 relative to a calomel electrode. To dissolve gold, the redox potential must be raised to more than 700.

In FIG. 10 the fine gold ore or copper concentrate leach residue 200 is re-pulped with brine electrolyte at a pH of 4 or greater in a repulper 201. The slurry is then fed into an absorption tower 202 where chlorine collected from sealed anode cells 203 is fed by line 209. Some or all the chlorine may be fed into the repulper 201 instead of the absorption tower. Each anode cell has an anode 206 and a solution electrode 207. The anode cells 203 are operated at sufficiently high voltage to produce a small amount of chlorine which dissolves the gold according to the following:

$$Au + 3/2\ Cl_2 \rightarrow AuCl_3 \tag{10}$$

Oxygen or air may be required to assist in the gold oxidation. To recover the gold, the solution is filtered in liquid/solid separation stage 205 and the gold solution potential is reduced to about 500 by adding fresh ore or a liquid stream which has a low potential. The gold may then be precipitated on activated carbon or by cathode cells 204 electrically connected to the gold anode cells. Gold is recovered through line 208.

I claim:

1. An electrochemical metal recovery apparatus comprising:

an anode cell, an anode assembly in the anode cell, and a first solution electrode assembly in the anode cell, a cathode cell, a cathode assembly in the cathode cell and a second solution electrode assembly in the cathode cell, an electrical connection between the first solution electrode assembly and the second solution electrode assembly, a direct current electrical potential source between the anode assembly and the cathode assembly, and means to transfer metal rich electrolyte from the anode cell to the cathode cell and means to transfer metal depleted electrolyte from the cathode cell to the anode cell.

2. An electrochemical metal recovery apparatus as in claim 1 wherein the first solution electrode assembly and the second solution electrode assembly together comprise an electrically conductive wall between the anode cell and the cathode cell.

3. An electrochemical metal recovery apparatus as in claim 1 wherein the first solution electrode assembly comprises at least one carbon or conductive metal electrode and the second solution electrode assembly comprises at least one carbon or conductive metal electrode.

4. An electrochemical metal recovery apparatus as in claim 1 wherein the anode cell comprises a cylindrical elongate body having a tangential lean electrolyte inlet at one end thereof and a tangential oxidised electrolyte outlet at the other end thereof, the anode comprising a cylindrical wall of the anode cell and the first solution electrode extending axially of the cylindrical body in the anode cell.

5. An electrochemical metal recovery apparatus as in claim 1 wherein the cathode cell comprises a cylindrical elongate body having a tangential metal bearing electrolyte inlet at one end thereof and a tangential lean electrolyte outlet at the other end thereof, a cylindrical wall of the cathode cell comprising or including the cathode and the second solution electrode extending axially of the cylindrical body in the cathode cell.

6. An electrochemical metal recovery apparatus as in claim 5 wherein the cathode comprises a plurality of metal buttons and the cylindrical wall is of an insulative material.

7. An electrochemical metal recovery apparatus as in claim 1 wherein either the anode cell or the cathode cell or both the anode cell and cathode cell comprises an annular body having inner and outer cylindrical walls defining the annular body therebetween, the outer cylindrical wall being the anode or cathode respectively and the inner cylindrical wall being the respective solution electrode, and wherein a tangential electrolyte inlet is provided at one axial end of the annular body and a tangential electrolyte outlet at the other axial end of the annular body.

8. An electrochemical metal recovery apparatus as in claim 7 wherein a further inner cylinder is added to act as another anode or cathode to increase the capacity of the apparatus.

9. An electrochemical metal recovery apparatus as in claim 1 wherein the anode cell comprises a tank, a circulation tube extending vertically in the tank and an impeller to provide agitation in the tank at the bottom of the circulation tube, the impeller including an impeller drive shaft which is hollow so as to enable the entry of air into the tank.

10. An electrochemical recovery apparatus as in claim 1 wherein the anode cell comprises a three zone tank, a lowermost zone being a slurry reaction zone, a central zone being a slurry disengagement zone and an uppermost zone being an electrolyte zone, a circulation tube extending vertically in the tank from the electrolyte zone to the slurry reaction zone and an impeller to provide agitation in the tank at the bottom of the circulation tube, the impeller including an impeller drive shaft which is hollow so as to enable the entry of the air into the tank, wherein the slurry and the electrolyte are fed down the circulation tube, and leached slurry is removed in the slurry.

11. An electrochemical metal recovery apparatus as in claim 10 wherein the circulation tube includes circulation pipes to enable recirculation of slurry in the slurry reaction zone.

12. An electrochemical metal recovery apparatus as in claim 1 wherein the cathode cell comprises a number of individual cathode cells arranged on two sides of a central circulation trough, each individual cathode cell having a metal plate cathode and being separated from its immediate neighbouring individual cathode cell by the second solution electrode and wherein electrolyte solution is adapted to flow within the cathode cell essentially down the central circulation trough spreading at a bottom of the cell so as to flow up either side in the individual cathode cells and then to flow across the top of the individual cathode cells and back down the central circulation trough and wherein mechanical agitation is provided by agitators in the central circulation trough.

13. An electrochemical metal recovery apparatus as in claim 1 wherein the cathode cell comprises a fluidised bed of metal powder with a plurality of cathodes and second solution electrodes extending into the fluidised bed of metal power.

14. An electrochemical metal recovery apparatus as in claim 13 further comprising a metal powder extraction tube and a screen to separate extracted powder into a coarse product and fines to be recycled into the fluidised bed.

15. An electrochemical metal recovery apparatus as in claim 13 wherein a portion of the cathode cell in contact with the fluidised metal powder bed is conductive metal and acts as the cathode with the second solution electrodes extending into the fluidised bed of metal powder.

16. An electrochemical metal recovery apparatus as in claim 1 adapted for the recovery of metal values from a waste solution having metal ions therein.

17. An electrochemical metal recovery apparatus as in claim 1 adapted for the recovery of metal values from an underground ore deposit or abandoned block caves or stopes by insitu leaching with air optionally added at the anode cells.

18. An electrochemical metal recovery apparatus as in claim 1 adapted for the recovery of metals from a crushed heap of ore or a dump of low grade ore further comprising an optional air source to add air to the anode cells.

19. An electrochemical metal recovery apparatus as in claim 1 further comprising:

an agitator disposed in the anode cell, a heater disposed in the anode cell, a source of air to be supplied to the anode cell for agitation, wherein a slurry of fine metal compound is dissolved in the anode cell provided with said agitator, heater and air for agitation, a reaction vessel where metal bearing electrolyte is retained and purified before metal is recovered in the cathode cell, and means to mix depleted electrolyte with fresh fine metal compound feed before it is returned to the anode cell.

20. An electrochemical metal recovery apparatus as in claim 1 adapted for the recovery of finely crushed higher grade material placed in a container the container being adapted to be flooded by oxidized electrolyte and the rich metal bearing electrolyte is purified before the metal is recovered in the cathode cell and further comprising an optional air source to add air to the anode cell.

21. An electrochemical metal recovery apparatus as in claim 1 including a separate slurry reaction vessel between the anode cell and the cathode cell.

22. An electromechanical metal recovery apparatus as in claim 21, further comprising a depleted oxidized electrolyte outlet from the anode cell to the separate slurry reaction vessel and an enriched purified electrolyte inlet to the cathode cell from the separate slurry reaction vessel.

23. A process for the recovery of gold in an electrochemical metal recovery apparatus which comprises:

an anode cell, an anode assembly in the anode cell, and a first solution electrode assembly in the anode cell, a cathode cell, a cathode assembly in the cathode cell and a second solution electrical assembly in the cathode cell, an electrical connection between the first solution electrode assembly and the second solution electrical assembly, a direct current electrical potential source between the anode assembly and the cathode assembly, and means to transfer metal rich electrolyte from the anode cell to the cathode cell and means to transfer metal depleted electrolyte from the cathode cell to the anode cell, said process comprising the steps of:

extracting gold from a finely ground ore or from a residue, re-pulping the gold containing material in brine to a pH of 4 to alkaline in a tank and passing the re-pulped gold containing material to an absorption tower to absorb chlorine produced from the anode cells to form a leached slurry, passing such slurry to the anode cells, operating the anode cells to maintain a redox of about 700 to dissolve gold, passing the leached slurry to a liquid/solid separation stage, subsequently reducing the redox potential of the gold bearing solution to about 500 by the addition of fresh ore or liquid streams of lower potential, recovering gold by precipitation on activated carbon or by electrolysis in cathode cells connected to the anode cells, and recycling the barren gold solution to a re-pulping tank.

24. A process as in claim 23, wherein the brine contains a mixture of halide ions selected from the group of chloride and bromide ions or chloride and iodide ions.

25. An electrochemical metal recovery apparatus comprising:

an anode cell, an anode assembly in the anode cell and a first solution electrode in the anode cell;

a cathode cell, a cathode assembly in the cathode cell and a second solution electrode in the cathode cell;

an electrical connection between the first solution electrode and the second solution electrode;

a direct current electrical potential source between the anode assembly and the cathode assembly; and means to transfer metal rich electrolyte from the anode cell to the cathode cell and means to transfer metal depleted electrolyte from the cathode cell to the anode cell;

wherein the electrical connection between the first solution electrode and the second solution electrode is electrically independent of the means for applying an electrical potential between the cathode and the anode.

26. An electromechanical metal recovery apparatus as in claim 24, wherein said means to transfer metal rich electrolyte transfers electrolyte and a catalyst selected from the group consisting of other halide ions and boron compounds.

27. An electromechanical metal recovery apparatus for removing metals from a slurry, comprising:

an anode cell, an anode assembly in the anode cell and a first solution electrode in the anode cell;

a cathode cell, a cathode assembly in the cathode cell and a second solution electrode in the cathode cell;

an electrical connection between the first solution electrode and the second solution electrode;

a direct current electrical potential source between the anode assembly and the cathode assembly; and means to transfer metal rich electrolyte from the anode cell to the cathode cell and means to transfer metal depleted electrolyte from the cathode cell to the anode cell;

wherein the electrical connection between the first solution electrode and the second solution electrode is electrically independent of the means for applying an electrical potential between the cathode and the anode, and said metals are selected from the group consisting of nickel, cobalt, and copper oxide ores.

* * * * *